2,984,648

COLOR INHIBITION OF STYRENE-ACRYLONITRILE COPOLYMERS BY POLYMERIZATION OF MONOMERS IN PRESENCE OF A PHENOL AND FREE RADICAL AGENT

Forrest V. Williams and Robert A. Ruehrwein, Dayton, Ohio, assignors to Monsanto Chemical Company, St. Louis, Mo., a corporation of Delaware No Drawing. Filed Mar. 5, 1956, Ser. No. 569,273

6 Claims. (Cl. 260—45.95)

This invention relates to the stabilization of polymers and to methods of preparing polymers. More specifically the invention relates to methods of preparing color-stable polymers from monomers which would otherwise be color-unstable in polymerized form.

Vinyl polymers such as styrene and styrene copolymers are generally regarded as being materials of good thermal stability, especially insofar as dimensional stability is concerned. However, such polymers are subject to discoloration, particularly at elevated temperatures. This phenomenon generally occurs in connection with the practice of extruding and processing the polymer compositions at elevated temperatures. Certain vinyl polymers, such as the styrene polymers and copolymers find extensive use in the fabrication of fibers, films and fabrics which frequently are subjected to ironing operations at elevated temperatures. It has been found that serious discoloration often develops during the fabrication and processing of such polymers at higher temperatures.

The primary purpose of this invention is to provide color-stable polymers including homopolymers and copolymers, such as vinyl polymers exemplified by the polymers of styrene, vinyl acetate, vinyl chloride and $\alpha$-methylstyrene. Other monomers include unsaturated hydrocarbons, such as ethylene, propylene, isobutylene and other mono-olefinic hydrocarbons having less than ten carbon atoms. A further purpose of the invention is to facilitate molding and other processing procedures usually conducted at elevated temperatures. A still further purpose of the invention is to provide a combination of components which can be added to various types of polymers and copolymers at the time of polymerization to improve the properties of the ultimate polymer with respect to resistance against discoloration.

Copolymers, including another mono-olefinic monomer copolymerizable with the said vinyl polymer component, are also contemplated, in particular, copolymers which include acrylonitrile. Particular examples are copolymers of from 1 to 40 or more weight percent acrylonitrile and 60 to 99 percent of one of the above-described vinyl components. Thus, the invention includes the well-known copolymers having utility in the field of film and molding composition production.

It has been found that by adding specific combinations of chemicals to the said vinyl polymers, improved resistance to discoloration may readily be developed. The nature of the chemical reactions, if any, resulting in the improved stability is not definitely understood and, accordingly, it is not desired to be bound by any theory as to such effect.

It has been discovered that thermally induced discoloration in vinyl polymers may be inhibited by conducting the polymerization of the said vinyl monomers in the presence of a phenolic compound together with a free-radical promoting agent, preferably a peroxidic free-radical liberating agent. Since not all phenolic compounds nor peroxide compounds, for example, produce the same degree of discoloration inhibition, the phenomenon apparently involves additional stabilization by the combination of the specific phenols and the specific peroxides described below. The total inhibition of the discoloration may involve additive or synergistic effects. Irrespective of the mechanism it has been found that phenols of the general type shown below are effective in this combination:

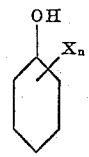

where X is selected from the group consisting of H, OH, aliphatic and alkoxy radicals having from 1 to 15 carbon atoms, and aryl-alkoxy, and phenolic-substituted alkyl radicals having from 6 to 15 carbon atoms. In the above formula, $n$ is a whole number from 1 to 5. Compounds comprehended within the above grouping include methoxy phenols, benzyloxyphenols, di-tertiary butyl cresols, 2,2'-methylene-bis(4-methyl-6-tertiary butylphenol), and hydroxy phenols, such as hydroquinone, catechol and resorcinol.

An advantage of the present invention is that the phenolic component and the free-radical promoting agent employed are usually readily and completely dispersible or soluble in the monomers, such as styrene or acrylonitrile monomer. A very intimate dispersion or solution in the monomeric starting material is obtained.

The polymerization can be effected at atmospheric or super-atmospheric pressures. Suitable catalysts are the free-radical promoting type, principal among which are peroxide-type polymerization catalysts and azo-type polymerization catalysts. Those skilled in the art are now fully familiar with a large number of peroxidic free-radical promoting, polymerization catalysts and a suitable one can readily be chosen by simple trial. Such catalysts can be inorganic or organic, the latter having the general formula: R'OOR'', wherein R' is an organic radical and R'' is an organic radical or hydrogen. These compounds are broadly termed peroxides, and in a more specific sense are hydroperoxides when R'' is hydrogen. R' and R'' can be organic radicals or preferably hydrocarbon radicals substituted with a great variety of substituents. It is preferred that R' be an organic radical having from 4 to 15 carbon atoms, and R'' be selected from the group consisting of hydrogen and organic radicals having from 4 to 15 carbon atoms. A still more preferred embodiment of the invention is the use of compounds in which R'' is an acyl or aroyl radical R—(CO)— having from 4 to 15 carbon atoms. By way of example, suitable peroxide-type catalysts include: benzoyl peroxide, tertiary butyl peroxide, tertiary butyl hydroperoxide, diacetyl peroxide, diethylperoxycarbonate, dimethyl phenyl hydroperoxymethane (also known as cumene hydroperoxide), among the organic peroxides; hydrogen peroxide, potassium persulfate, perborates and other "per" compounds among the inorganic peroxides. The azo-type polymerization catalysts are also well known to those skilled in the art. These are characterized by the presence in the molecule of the group —N=N— wherein the indicated valences can be attached to a wide variety of organic radicals, at least one, however, preferably being attached to a tertiary carbon atom. By way of example of suitable azo-type catalysts can be mentioned $\alpha,\alpha$-azodiisobutyronitrile, p-bromobenzenediazonium fluoroborate, azomethane, phenyldiazonium halides, diazoaminobenzene, p-bromobenzenediazonium hydroxide, p-tolyldiazoaminobenzene. The peroxy-type or azo-type or other free-radical promoting type of polymerization catalyst is used in small but catalytic amounts, which are generally not in excess of 0.5 percent by weight based upon the monomeric material. A suitable quantity is generally in the range of 0.01 to 0.5 percent by weight.

In addition to the above free-radical liberating agents, further compounds which may be employed in this relationship include N-nitroso-p-bromacetanilide, hydrazine and its derivatives such as hydrazine hydrochloride and dibenzoyl hydrazine; and organometallic compounds such as tetraethyl lead, etc. For convenience, the peroxygen-type catalysts will be hereinafter referred to as peroxidic compounds.

The two said components described above, i.e., the phenolic component and the free-radical promoting component may be utilized in the relative proportions of from 0.001 weight percent to 1 weight percent of the phenolic component, and from 0.01 weight percent to 0.5 weight percent of the free-radical promoting component based upon the monomeric material. Various combinations of polymers may require various proportions of the two components within the above general limits. It has been found that the combination of the two said components yields results indicating greater inhibition of discoloration than may be achieved by the use of either component alone.

The above proportions of the peroxide component and the phenolic component are critical in the practice of the present invention. The use of smaller proportions of either of the said modifying chemicals fails to accomplish the desired color inhibiting effect. It has been found that the use of greater proportions of the phenolic component than set forth above results in an inhibition of polymerization, resulting in low conversion of the monomer into the desired polymer, as well as failure to achieve the desired proportions of the two or more individual monomers entering into a copolymer composition. It has likewise been found that the use of excess amounts of the phenolic component results in the production of a polymer having a lower softening temperature than can be achieved by the use of the limited proportions set forth above.

It has also been found that the use of greater amounts of the peroxidic component than are described above, results in the production of polymers having a lower molecular weight than may be achieved by operating within the above limitations. Another disadvantage resulting from the use of greater proportions of the peroxide is the acceleration of the rate of polymerization of the monomer, thus presenting a difficult problem of heat removal and resulting in the production of polymers having less color-stability.

The present invention is carried out by combining or mixing the desired combination of the phenolic component and the free-radical promoting component such as a peroxide compound with a monomeric form of the polymer. It has been found essential to have the said modifying chemicals of the instant invention present throughout the polymerization, since the subsequent addition of such agents after polymerization does not accomplish the desired result of inhibiting color formation. In conducting the polymerization, the modifying compounds may therefore be dissolved in one or both of the monomers or may be dissolved in a solvent such as alcohol or water for introduction into the polymerization system. The polymerization may be carried out by any of the conventional methods at the usual temperatures, such as mass polymerization or by the use of an added liquid such as an organic solvent typified by alcohol, acetone, pentane, etc. Suspension polymerization using an aqueous medium together with any emulsifying agent which may be desired is likewise contemplated within the present invention.

The following examples illustrate specific embodiments of the present invention:

EXAMPLE 1

In order to show the effectiveness of the above combination of color-stabilizing agents in stabilizing homo-polymers, a number of tests were carried out with distilled styrene as the staring monomer. The additives employed, and the designations used for each of these in the following table were: lauroyl peroxide (LP); 2,6-di-t-butyl-para-cresol (DTBPC); and t-butyl catechol (TBC). Concentrations are expressed as weight percent on the monomer.

The monomeric styrene was utilized without any additive as a control test, and also with the additive compounds utilized singly and in combination. The polymerization method employed was mass polymerization under nitrogen in sealed glass tubes at 116 hours at 77° C., followed by 7 hours at 115° C. The resultant polymers were molded into strips 0.060" thick, and were then aged at a temperature of 165° C. for 21 hours. These thermally degraded samples were then dissolved in chloroform (2 g. of polymer per 50 ml. chloroform) and the degree of color formation was measured for each sample. The amount of color formed was determined by measuring the percentage transmission of a monochromatic light source of 0.380 micron wave length passing through the sample. The test data are summarized below:

*Table I*

COLOR STABILITY OF POLYSTYRENE AFTER 21 HOURS AT 165° C.

| Additive | | Transmission, percent |
|---|---|---|
| Phenol | Peroxide | |
| None | None | 74.1 |
| Do | 0.1% LP | 72.6 |
| 0.005% TBC | None | 77.1 |
| Do | 0.1% LP | 80.0 |
| 0.005% DTBPC | | 74.5 |
| Do | 0.1% LP | 77.7 |

The above data show the enhanced effect which is achieved in improving the color stability of a homo-polymer of styrene by the polymerization of the styrene in the presence of the combination of a phenolic compound and a peroxidic component.

EXAMPLE 2

Styrene-acrylonitrile copolymer (74:26 weight percent) was mass polymerized under nitrogen in sealed glass tubes for 48 hours at 76° C., followed by 3 hours at 120° C., in the presence of 0.1 weight percent of lauroyl peroxide and 0.1 weight percent of 2,6-di-tertiary-butyl-para-cresol. The polymer was molded into 0.060 inch strips which were then heated in open test tubes in an oven at 165° C. for 16 hours as an accelerated aging test in order to determine the amount of discoloration.

A control sample identical to the above, but without the combination of the lauroyl peroxide and the di-tertiary-butyl-para-cresol was also prepared and subjected to the accelerated aging test. In addition, two control samples utilizing the above respective amounts of only one of the above additive components were also polymerized and subjected to the above-described accelerated aging test.

The degree of discoloration of the four samples was then measured by determining the percentage transmission of light (0.380 micron wave length). The tests were conducted on solutions of the polymers prepared to contain 2 g. of polymer per 50 ml. of chloroform (LP represents lauroyl peroxide, and DTBPC represents 2,6-di-tertiary-butyl-para-cresol).

Table II
THERMAL STABILITY OF POLYMERS

| Additive | Percent transmission | |
| --- | --- | --- |
| | Unmolded | Heating, 16 hrs. |
| None (control) | 97.6 | 53.5 |
| 0.1% LP | | 44.0 |
| 0.1% DTBPO | | 70.9 |
| 0.1% LP<br>0.1% DTBPO | } 100.0 | 84.8 |

The above data, illustrative of the synergistic effect shows that the combination of the above-described components gives a superior result relative to the use of either component employed alone.

Additional phenolic and peroxidic compositions which have been shown to be efficacious for the present purpose, utilizing the procedure of Example 2 are summarized in the table below, together with the precentage of light transmission representative of the stabilized polymer. The said light transmission values were measured with a solution containing 2 g. of the styrene-acrylonitrile polymer in 50 ml. of chloroform, utilizing a monochromatic light beam of 0.380 micron wave length.

Table III
COLOR-STABILITY OF STYRENE (74 WT. PERCENT)-ACRYLONITRILE (26 WT. PERCENT) COPOLYMER AFTER 16 HRS. OF AGING AT 165° C.

| Additive | | Transmission |
| --- | --- | --- |
| Phenol (0.1 Wt. Percent) | Peroxide (0.1 Wt. Percent) | |
| None | None (before aging) | 98.0 |
| Do | None (after aging) | 52.6 |
| p-Methoxyphenol | None | 75.0 |
| Do | Lauroyl peroxide | 81.1 |
| Hydroquinone | None | 79.4 |
| Do | Lauroyl peroxide | 80.1 |
| p-Benzyloxyphenol | None | 74.8 |
| Do | Lauroyl peroxide | 77.4 |
| 2,6-di-t-butyl-p-cresol | None | 79.4 |
| Do | Lauroyl peroxide | 88.7 |

What is claimed is:

1. A process for inhibiting the discoloration of styrene copolymers with acrylonitrile which comprises polymerizing the monomers of the said polymers in the presence of 0.001% to 1% of a phenol selected from the group consisting of:

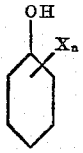

wherein X is selected from the class consisting of H, OH, aliphatic and alkoxy radicals having from 1 to 15 carbon atoms and aryloxy and phenolic-substituted alkyl radicals having from 6 to 15 carbon atoms, and $n$ is a whole number from 1 to 5 in combination with 0.01% to 0.5% of a free-radical promoting agent selected from the group consisting of peroxidic and azo compounds.

2. A process for inhibiting the discoloration of styrene copolymers with acrylonitrile which comprises polymerizing the monomers of the said polymers in the presence of 0.001% to 1% of a phenol selected from the group consisting of:

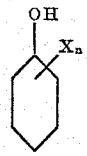

wherein X is selected from the class consisting of H, OH, aliphatic and alkoxy radicals having from 1 to 15 carbon atoms and aryloxy and phenolic-substituted alkyl radicals having from 6 to 15 carbon atoms, and $n$ is a whole number from 1 to 5 in combination with 0.01% to 0.5% of a peroxidic free-radical liberating agent.

3. A process for inhibiting the discoloration of styrene acrylonitrile copolymers, which comprises polymerizing the said monomers in the presence of 0.001% to 1% of 2,6-di-tertiary-butyl-para-cresol in combination with 0.01% to 0.5% of lauroyl peroxide.

4. A process for inhibiting the discoloration of styrene acrylonitrile copolymers, which comprises polymerizing the said monomers in the presence of 0.001% to 1% of para-methoxy phenol in combination with 0.01% to 0.5% of lauroyl peroxide.

5. A process for inhibiting the discoloration of styrene acrylonitrile copolymers, which comprises polymerizing the said monomers in the presence of 0.001% to 1% of a hydroquinone in combination with 0.01% to 0.5% of lauroyl peroxide.

6. A process for inhibiting the discoloration of styrene acrylonitrile copolymers, which comprises polymerizing the said monomers in the presence of 0.001% to 1% of para-benzyloxyphenol in combination with 0.01% to 0.5% of lauroyl peroxide.

References Cited in the file of this patent
UNITED STATES PATENTS

| | | | |
| --- | --- | --- | --- |
| 2,452,669 | Levine | Nov. 2, | 1948 |
| 2,500,780 | Van Gliden | Mar. 14, | 1950 |
| 2,566,537 | Schmerling | Sept. 4, | 1951 |
| 2,679,493 | Anderson | May 25, | 1954 |
| 2,698,312 | Parker | Dec. 28, | 1954 |
| 2,726,226 | Werkheiser | Dec. 6, | 1955 |

FOREIGN PATENTS

| | | | |
| --- | --- | --- | --- |
| 520,923 | Canada | Jan. 17, | 1956 |

OTHER REFERENCES

Cass et al.: "Inhibition of Unsaturated Polyesters," Industrial and Eng. Chem., August 1954, pages 1619–1624.